United States Patent
Ibrahim et al.

(10) Patent No.: US 8,311,208 B2
(45) Date of Patent: Nov. 13, 2012

(54) METHOD FOR PREDICTING CALL WAITING TIMES

(75) Inventors: Rouba Ibrahim, New York, NY (US); Patrick Tendick, Basking Ridge, NJ (US)

(73) Assignee: Avaya Inc., Basking Ridge, NJ (US)

(*) Notice: Subject to any disclaimer, the term of this patent is extended or adjusted under 35 U.S.C. 154(b) by 348 days.

(21) Appl. No.: 12/731,994

(22) Filed: Mar. 25, 2010

(65) Prior Publication Data

US 2011/0235798 A1 Sep. 29, 2011

Related U.S. Application Data

(60) Provisional application No. 61/317,012, filed on Mar. 24, 2010.

(51) Int. Cl.
*H04M 3/00* (2006.01)

(52) U.S. Cl. ......... 379/265.02; 379/265.05; 379/265.07; 379/265.08; 379/265.13; 379/265.14; 379/266.01; 379/266.03; 379/266.06

(58) Field of Classification Search . 379/265.01–266.06
See application file for complete search history.

(56) References Cited

U.S. PATENT DOCUMENTS

| | | | |
|---|---|---|---|
| 5,185,780 A | 2/1993 | Leggett | |
| 6,137,425 A | 10/2000 | Oster et al. | |
| 6,157,655 A | 12/2000 | Shtivelman | |
| 6,694,009 B1 | 2/2004 | Anderson et al. | |
| 6,754,333 B1 | 6/2004 | Flockhart et al. | |
| 7,103,562 B2 | 9/2006 | Kosiba et al. | |
| 7,200,219 B1* | 4/2007 | Edwards et al. | 379/265.01 |
| 7,787,609 B1* | 8/2010 | Flockhart et al. | 379/265.01 |
| 2005/0207559 A1* | 9/2005 | Shtivelman et al. | 379/266.06 |
| 2009/0154688 A1* | 6/2009 | Jay et al. | 379/265.12 |
| 2010/0027779 A1* | 2/2010 | Omiya | 379/266.01 |

* cited by examiner

*Primary Examiner* — Joseph J Nguyen
(74) *Attorney, Agent, or Firm* — Maldjian Law Group LLC; John P. Maldjian, Esq.; Alexander D. Walter, Esq.

(57) ABSTRACT

A method is provided for the production of accurate waiting time estimates based on at least one of (i) a queue arrival rate and (ii) estimated queue length. In a first embodiment of the present invention, the waiting time for a caller is determined on the basis of a queue arrival rate. In a second embodiment of the present invention, the waiting time for a caller is determined on the basis of a queue length estimate. The queue length estimate is a prediction of the size of the queue at a given time instant.

17 Claims, 12 Drawing Sheets

METHOD FOR PREDICTING CALL WAITING TIMES

CROSS-REFERENCE TO RELATED APPLICATIONS

This application claims the benefit of U.S. provisional application Ser. No. 61/317,012, filed Mar. 24, 2010, entitled Method for Predicting Call Waiting Times, which is also incorporated by reference.

FIELD OF THE INVENTION

The present invention relates to communications in general, and, more particularly, to contact center technology.

BACKGROUND OF THE INVENTION

A contact center is a communication system that connects customers to customer service agents. When customers need assistance, they call a customer service number that connects them to a contact center. The contact center plays pre-recorded messages to the customers in order to obtain basic information such as account numbers. Based on this information, the contact center places the customers in queues where they wait for agents to become available and take their calls.

When customers are placed in queues, they are often provided with estimates of their waiting times. The accuracy of the estimates affects the customers' satisfaction with the service provided by the contact center. If a customer is provided with a waiting time estimate that is off mark, the customer may become dissatisfied. Conversely, if the customer is provided with an accurate estimate, the customer is more likely to believe that the contact center operates properly. Therefore, it is beneficial for contact centers to provide customers with accurate waiting time estimates.

SUMMARY OF THE INVENTION

The present invention provides a method that enables contact centers to produce accurate waiting time estimates based on at least one of (i) a queue arrival rate and (ii) estimated queue length.

In a first embodiment of the present invention, the waiting time for a caller is determined on the basis of a queue arrival rate. For the purposes of this specification, the term "queue arrival rate" is defined as the number of callers that are placed in a queue per unit time. Using queue arrival rates to determine call waiting times can boost the efficiency of contact centers. Contact centers can determine the arrival rates for their queues simply by observing the states of the queues. The determination of queue arrival rates does not require extensive calculations.

In a second embodiment of the present invention, the waiting time for a caller is determined on the basis of a queue length estimate. The queue length estimate is a prediction of number of callers in the queue at a given time instant. Queue length estimates are useful in situations where the states of call waiting queues are not readily observable by those contact center components that calculate the waiting times. The queue length estimates remove the need for the contact center components that calculate waiting times to interact with other contact center components in order to obtain information about the length of queues. Therefore, the second embodiment of the present invention can increase the autonomy of different contact center components.

In accordance with the present invention, queue length is estimated based on at least one of an agent availability measure and queue service rate.

For the purposes of this specification, the term "availability measure" is defined as the proportion of a time period, during which an agent is considered to be working, in which the agent is either available to answer calls or is busy answering calls. The use of availability measures allows contact centers to account for losses in agent productivity that are due to incidental tasks such as the agents attending team meetings, for example.

Furthermore, for the purposes of this specification, the term "service rate" of a queue is defined as the number of calls from the queue that are served by agents per unit time. The service rate is used for determining the proportion of callers that are expected to abandon a queue during a time period. A caller abandons a queue when the connection between the caller and the contact center that manages the queue is terminated prior to the caller being connected to an agent. The proportion of callers that are expected to abandon the queue is used in estimating the length of the queue.

It is to be understood that the above embodiments and their instances are provided to better illustrate different aspects of the present invention. They are in no way exhaustive of the full scope of the invention. The following disclosure teaches examples of some embodiments of the present invention in detail.

DETAILED DESCRIPTION

Figure 1:
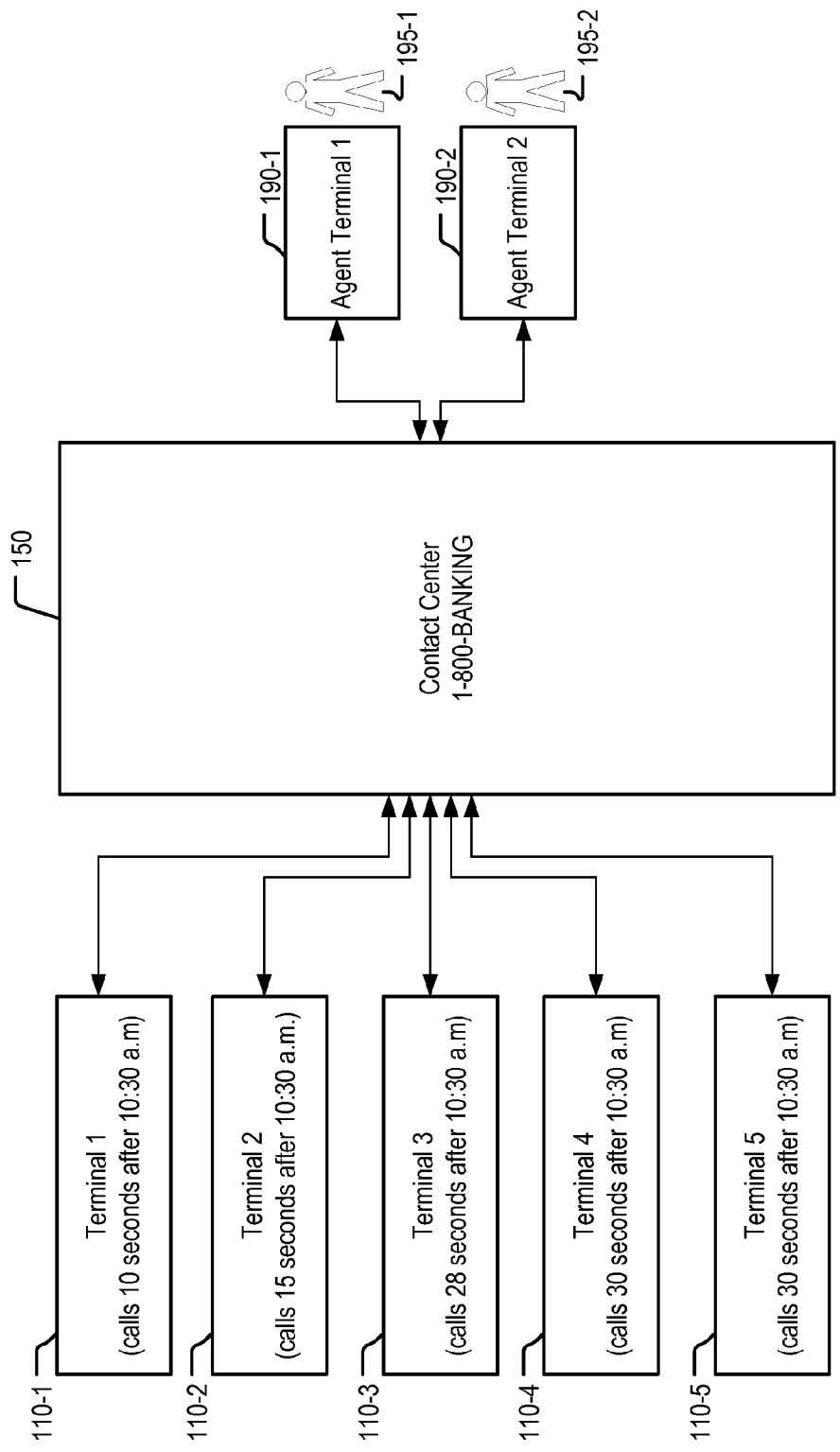
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises caller terminal(s) 110-$i$, contact center 150, and agent terminal(s) 190-$j$, where $i \in \{1, 2, 3, 4, \text{and } 5\}$ and $j \in \{1 \text{ and } 2\}$.

Although FIG. 1 depicts only five terminals as being connected to contact center 150, those skilled in the art will readily recognize, after reading this disclosure, that any number of terminals can be connected to the contact center (e.g., 1, 3, 30, 300, 1000, etc.). Furthermore, it will be clear to those skilled in the art, after reading this disclosure, that any number of agent terminals and agents can be serving calls that are received at contact center 150 (e.g., 1, 5, 50, 500, etc.).

Caller terminal 110-$i$, five of which terminals are depicted in FIG. 1, is a communication terminal. In accordance with the illustrative embodiment of the present invention, caller terminal 110-$i$ is a desk-set telephone receiver, but it will be clear to those skilled in the art, after reading this disclosure, how to make and use alternative embodiments of the present invention in which caller terminal 110-$i$ is another type of communication terminal, such as, for example, and without limitation, cellular telephone, personal computer, portable gaming device, and others.

Agent terminal 190-$j$, two of which are depicted in FIG. 1, is a communication terminal. In accordance with the illustrative embodiment of the present invention, agent terminal 190-$j$ is a desktop computer, but it will be clear to those skilled in the art, after reading this disclosure, how to make and use alternative embodiments of the present invention in which agent terminal 190-$j$ is another type of communication terminal, such as, for example, and without limitation, desk-set telephone receiver, cellular telephone, portable gaming device, and others.

Contact center 150 is a communication system that connects caller terminal 110-$i$ to agent terminal 190-$j$. In accordance with the illustrative embodiment of the present invention, contact center 150 is an automated call distribution (ACD) center, but it will be clear to those skilled in the art, after reading this disclosure, how to make and use alternative embodiments of the present invention in which contact center 150 distributes another type of communication, such as, for example, and without limitation, incoming Internet chat requests, incoming video calls, incoming emails, incoming text messages, etc.

Agent 195-$j$, two of whom are depicted in FIG. 1, is a natural person that operates agent terminal 190-$j$. In accordance with the illustrative embodiment of the present invention, agent 195-$j$ is a natural person, but it will be clear to those skilled in the art, after reading this disclosure, how to make and use alternative embodiments of the present invention in which agent 195-$j$ is software that is capable of interacting with callers (e.g., an interactive voice response (IVR) system, etc.).

Contact center 150 evaluates the performance of agents 195-$j$ according to at least two characteristics: handling time and availability. The handling time of an agent is the time which it takes the agent to complete a call with a caller. An agent can have different average handling times for the different queues the agent is serving. The methods in which the present invention obtains and uses handling times for agents 195-$j$ are further described in the discussion with respect to FIGS. 7-10.

Availability reflects the proportion of time during which an agent is either available to answer calls or is busy answering calls. An agent is available to handle phone calls when the agent is present at his or her terminal and is either handling or willing to handle incoming calls. Conversely, an agent is unavailable when the agent is handling administrative matters, such as filling time sheets, attending team meetings, taking breaks and others. Therefore, "availability" measures the loss in agent productivity due to activities that are incidental to the primary duties of agents. The methods in which the present invention obtains and uses agent availability are further described in the discussion with respect to FIGS. 7-10.

Figure 2:
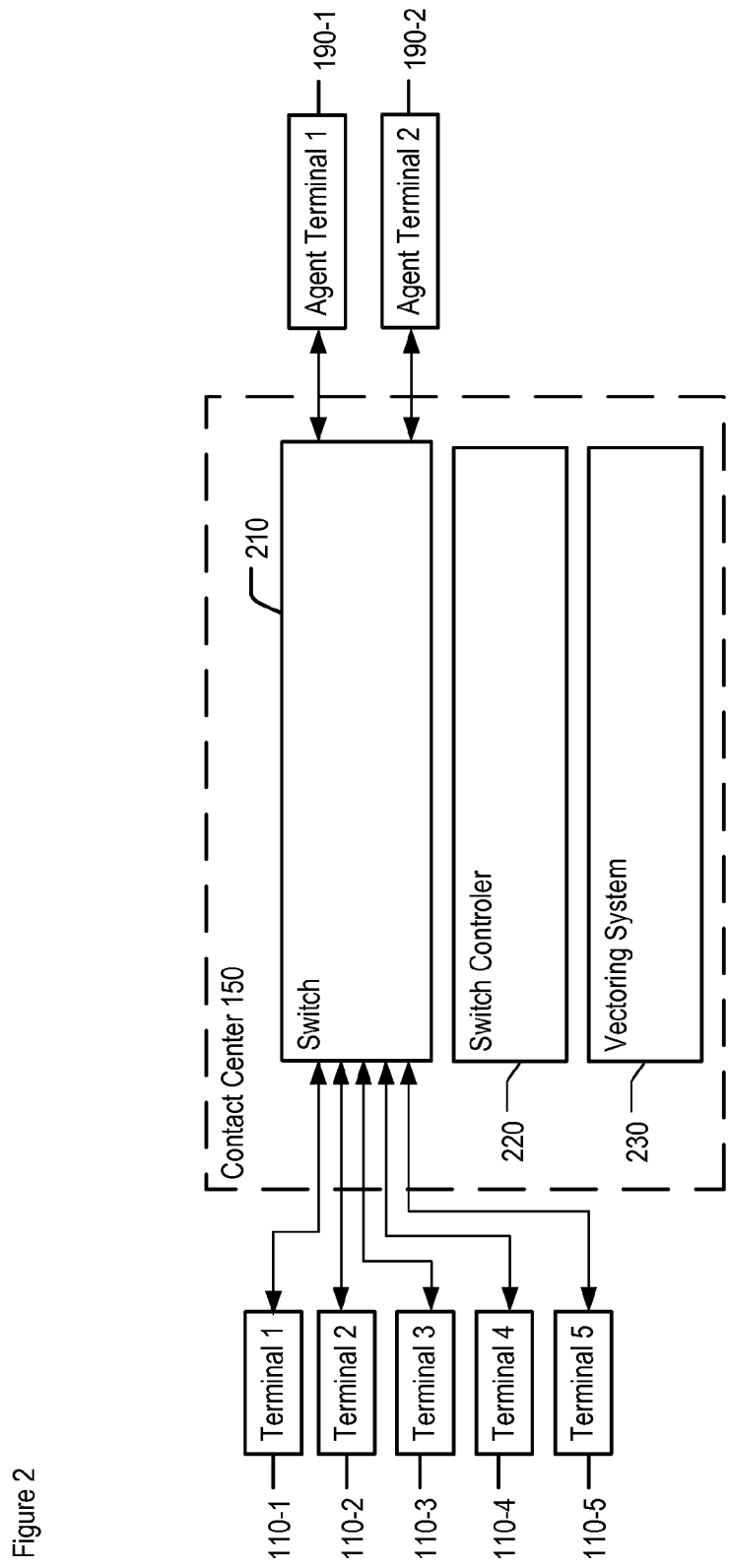
FIG. 2 depicts a schematic diagram of the salient components of the illustrative embodiment of the present invention.

FIG. 2 depicts a schematic diagram of the salient components of the illustrative embodiment of the present invention. The illustrative embodiment comprises caller terminal(s) 110-$i$, contact center 150, agent terminal(s) 190-$j$, switch 210, switch controller 220, and vectoring system 230.

Specifically, FIG. 2 depicts the internal structure of contact center 150. Although contact center 150 is depicted as a monolithic system, those skilled in the art will readily recognize that alternative embodiments of the present invention can be devised in which contact center 150 is a collection of discrete components (e.g., servers, switches, storage devices, etc.). Specifically, it will be clear to those skilled in the art, after reading this disclosure, how to make and use alternative embodiment of the present invention in which switch controller 220 is hosted on a server that is separate from the other components of contact center 150. And also, it will be clear to those skilled in the art, after reading this disclosure, how to make and use alternative embodiments of the present invention in which vectoring system 230 is hosted on one or more servers that are separate from the other components of contact center 150.

Switch 210 is a communication switch for setting up connections between caller terminal 110-$i$, agent terminal 190-$j$, and vectoring system 230. Although, FIG. 2 depicts a single switch, it will be clear to those skilled in the art, after reading this disclosure, how to make and use alternative embodiments of the present invention in which a plurality of switches is used.

Switch controller 220 is hardware and software for controlling switch 210. Switch controller is responsible for managing queues 310-1 and 310-2. When an agent becomes available to communicate with a caller terminal, switch controller 220 receives an indication to that effect. The indication is transmitted either from the terminal of the agent or from switch 210.

Upon receiving the indication, switch controller 220 identifies one or more queues which are served by the agent whose terminal has become available. Then, switch controller 220 selects one of the identified queues and retrieves an identifier corresponding to a caller terminal from the front of the selected queue. After that, switch controller 220 instructs switch 210 to set up a communication session between the caller terminal corresponding to the retrieved identifier and the terminal of the agent that has become available.

Vectoring system 230 is a system for routing calls that are incoming to contact center 150. When a call from caller terminal 110-$i$ is received at contact center 150, vectoring system 230 executes a program which obtains information about the reason for the call. Based on this information, vectoring system 230 routes the call to an agent that is capable of assisting the caller. The operation of vectoring system 230 is further described in the discussion with respect to FIG. 5.

Figure 3:
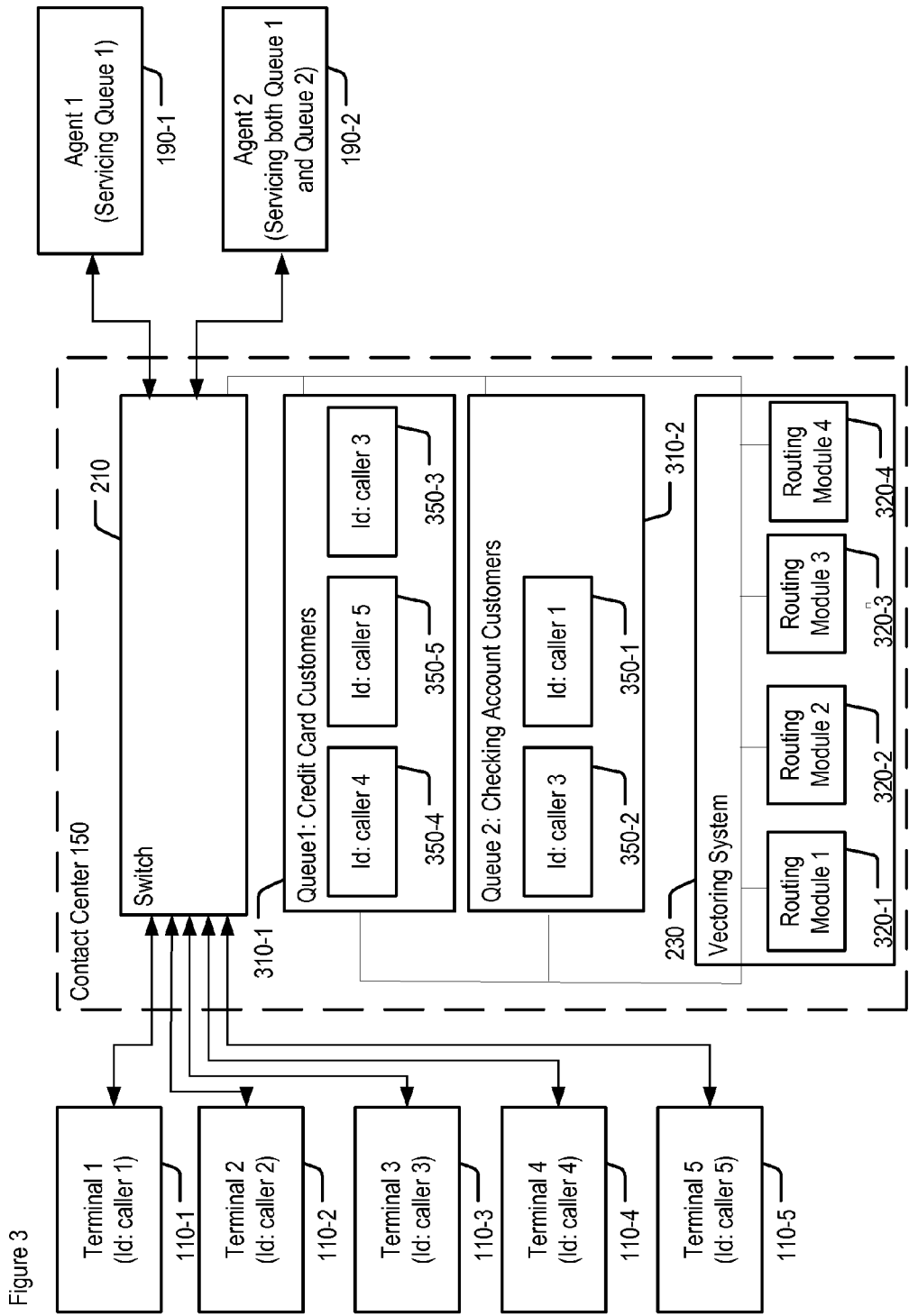
FIG. 3 depicts a schematic diagram of the salient components of the illustrative embodiment of the present invention.

FIG. 3 depicts a schematic diagram of the salient components of the illustrative embodiment of the present invention. The illustrative embodiment comprises caller terminal(s) 110-$i$, contact center 150, agent terminal(s) 190-$j$, switch 210, queue(s) 310-$j$, record(s) 350-$i$, vectoring system 230, and routing module(s) 320-$k$ where $k \in \{1, 2, 3, \text{and } 4\}$.

Although FIG. 3 depicts only two queues, it will be clear to those skilled in the art, after reading this disclosure, that contact center 150 can maintain any number of queues (e.g., 1, 3, 5, 15, 25, 500, etc.). Furthermore, those skilled in the art will readily recognize, after reading this disclosure, that alternative embodiments of the present invention can be devised in which vectoring system 230 comprises any number of routing modules (e.g., 1, 2, 10, 100, etc.). And still furthermore, it will be clear to those skilled in the art, after reading this disclosure, that queue 310-*j* can comprise any number of records (e.g., 1, 2, 10, 100, etc.).

Queue 310-*j*, two of which are depicted in FIG. 3, is a first-in-first-out (FIFO) data structure. In accordance with the illustrative embodiment of the present invention, queue 310-*j* is stored in the memory of contact center 150. However, it will be clear to those skilled in the art, after reading this disclosure, how to make and use alternative embodiments of the present invention in which queue 310-*j* is stored at an alternative location, such as, for example, and without limitation, network access drive, storage device that is internal to switch 210, storage of a server hosting vectoring system 230, storage of a server hosting switch controller 220, etc.

Queue 310-*j* contains records 350-*i*. In accordance with the illustrative embodiment of the present invention, the records store identifiers corresponding to caller terminals 110-*i*. An identifier corresponding to a communication terminal is an identifier used by contact center 150 to identify a caller terminal that is placed in queue 310-*j*. In accordance with the illustrative embodiment of the present invention, the identifier corresponding to a communication terminal is an endpoint identifier for one of caller terminals 110-*i*. However, it will be clear to those skilled in the art, after reading this disclosure, how to make and use alternative embodiments of the present invention in which the identifier corresponding to a communication terminal is another item of information (e.g., caller legal name, caller account number, etc.). In its alternative embodiments, the present invention relies on translation tables to convert the identifiers corresponding to communication terminals to information that can be used by switch 210 in establishing communication sessions between caller terminals 110-*i* and agent terminals 190-*j* (e.g., endpoint identifiers, switch port numbers, connection type information, internet protocol (IP) addresses, etc.).

Queue 310-1 is populated by vectoring system 230. When a person calls contact center 150, vectoring system 230 determines the reason for the call. If the call is in relation to a credit card account, vectoring system places an identifier corresponding to the caller's terminal at the end of queue 310-1. In this way, callers that have similar inquiries are kept in the same queue.

Queue 310-1 is served by agents 195-1 and 195-2. When one of the agents becomes available, switch controller 220 retrieves, from the front of queue 310-1, an identifier corresponding to a caller terminal. Then, switch controller 220 instructs switch 210 to connect the caller terminal to the terminal of the agent who has become available.

Queue 310-2 is populated by vectoring system 230 is in the same fashion as queue 310-1. However, unlike queue 310-1, queue 310-2 is for people that call contact center 150 in relation with checking accounts. Queue 310-2 is served by agent 195-2 only.

Routing module 320-*k* is a software process that is executed by vectoring system 320. The operation of routing module 320-*k* is further described in the discussion with respect to FIG. 5.

Figure 4:
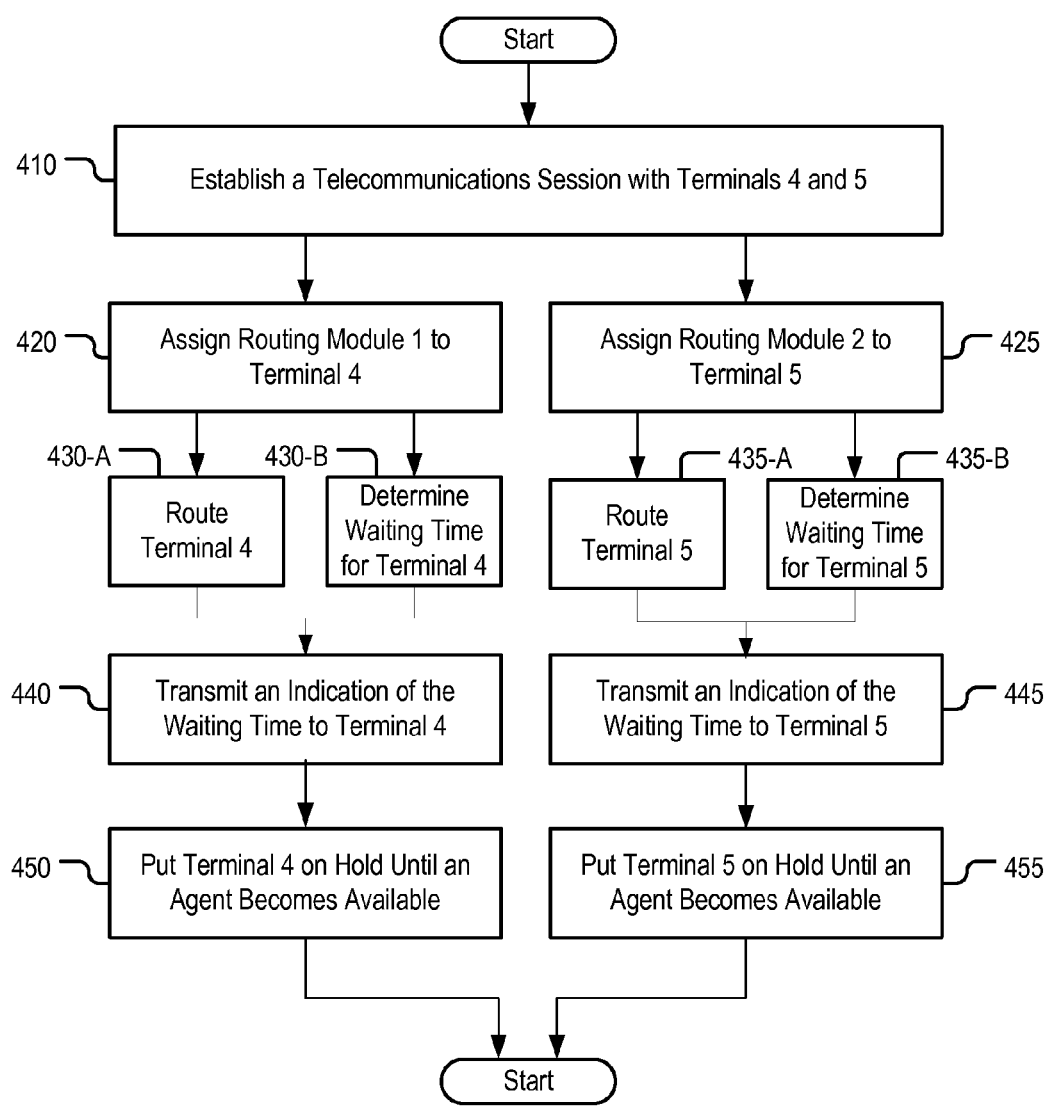
FIG. 4 depicts a flowchart of the execution of the salient tasks associated with the operation of the illustrative embodiment of the present invention.

FIG. 4 depicts a flowchart of the execution of the salient tasks associated with the operation of the illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, contact center 150 receives calls from caller terminals 110-4 and 110-5 and establishes a communication session with each of them.

At task 420, contact center 150 assigns routing module 320-1 to caller terminal 110-4. Additionally, contact center 150 connects caller terminal 110-4 to routing module 320-1.

At task 425, contact center 150 assigns routing module 320-2 to caller terminal 110-5. Additionally, contact center 150 connects caller terminal 110-5 to routing module 320-2.

At task 430-A, routing module 320-1 routes caller terminal 110-4 to one of queues 310-*j*. As a result of the execution of task 430-A, an identifier corresponding to caller terminal 110-4 is placed in queue 310-1. The execution of task 430-A is further described in the discussion with respect to FIG. 5.

At task 430-B, routing module 320-1 determines the waiting time for caller terminal 110-4. Although, in accordance with the illustrative embodiment of the present invention, task 430-B is executed by routing module 320-1, it will be clear to those skilled in the art, after reading this disclosure, how to make and use alternative embodiments of the present invention in which task 430-B is executed by another component of contact center 150 (e.g., switch 210, switch controller 220, etc.). The execution of task 430-B is further described in the discussion with respect to FIGS. 6-10.

At task 435-A, routing module 320-2 routes caller terminal 110-5 to one of queues 310-*j*. As a result of the execution of task 430-A, an identifier corresponding to caller terminal 110-5 is placed in queue 310-1. Task 435-A is executed according to the methods described in relation to task 430-A.

At task 435-B, routing module 320-1 determines the waiting time for caller terminal 110-5. Task 435-B is executed according to the methods described in relation to task 430-B.

At task 440, contact center 150 transmits an indication of the waiting time calculated at task 430-B to caller terminal 110-4.

At task 445, contact center 150 transmits an indication of the waiting time calculated at task 435-B to caller terminal 110-5.

At task 450, contact center 150 puts caller terminal 110-4 on hold until an agent becomes available to take the call.

At task 455, contact center 150 puts caller terminal 110-5 on hold until an agent becomes available to take the call.

Figure 5:
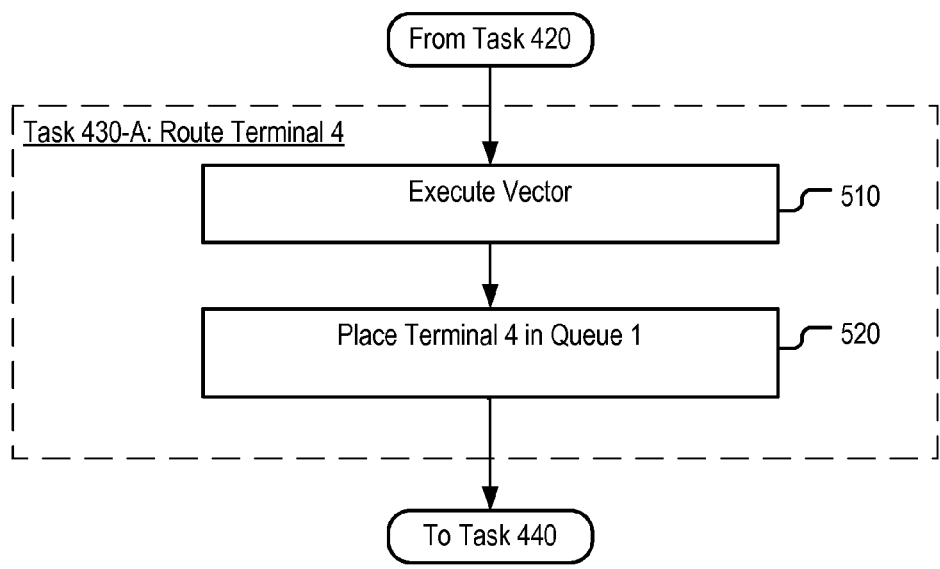
FIG. 5 depicts a flowchart of the execution of the salient subtasks associated with the performance of task 430-A.

FIG. 5 depicts a flowchart of the execution of the salient subtasks associated with the performance of task 430-A. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, routing module 320-1 executes a vector in order to select an appropriate queue for caller terminal 110-4. A vector is a set of commands that define the processing of a call by routing module 320-1. In accordance with the illustrative embodiment of the present invention, the following vector is executed:

10: Play Announcement: "If you are calling about your credit card account press one (1). If you are calling about your checking account press two (2)";
20: Receive input from caller;
30: If the input is one (1), place the caller in Queue 1;
40: If the input is two (2), place the caller in Queue 2;

At task 520, routing module 320-1 places a record in queue 310-1. The record contains an identifier corresponding to a caller terminal. In accordance with the illustrative embodiment of the present invention, the identifier is an endpoint identifier for caller terminal 110-4. However, it will be clear to those skilled in the art, after reading this disclosure, how to make and use alternative embodiments of the present invention in which an alternative identifier is used, such as, for example, and without limitation, an account number, social security number, legal name of caller, etc.

Figure 6:
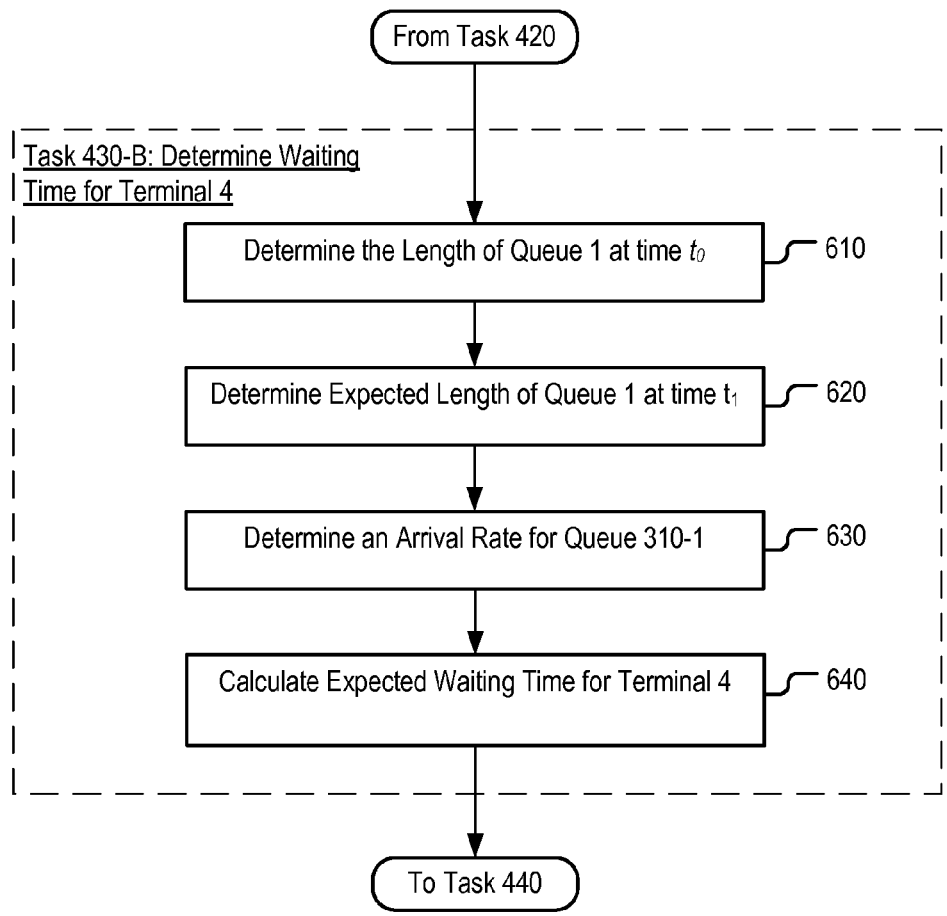
FIG. 6 depicts a flowchart of the execution of the salient subtasks associated with the performance of task 430-B.

FIG. 6 depicts a flowchart of the execution of the salient subtasks associated with the performance of task 430-B. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, routing module 320-1 determines the length of queue 310-1 at time $t_0$. In accordance with the illustrative embodiment of the present embodiment, time $t_0$ is a present time instant. Thus, at task 610, routing module 320-1 determines the present length of queue 310-1.

In an alternative embodiment of the present invention, at task 610, the routing module 320-1 determines a past length of the queue 310-1 (e.g., the size of queue 310-1 5 minutes ago). In the alternative embodiment of the present invention, time $t_0$ is in the past, relative to the period when tasks 610-640 are executed.

At task 620, routing module 320-1 determines the expected length of queue 310-1 at time $t_1$. In accordance with the illustrative embodiment of the present invention, the expected length of queue 310-1 depends on at least one of: (i) rate of arrival of callers to the queue, (ii) proportion of callers that are expected to abandon the queue before being connected to an agent, and (iii) number of expected service completions for the queue. Specifically, the illustrative embodiment of the present invention calculates the expected length of queue 310-1 according to the equation:

$$Q_1 = \max\{0, Q_0 + ((1-p)(t_1-t_0)\lambda - \kappa)\} \quad \text{(Eq. 1)}$$

where $Q_0$ is the length of queue 310-1 at time $t_0$, p is the proportion of callers that are expected to abandon queue 310-1 during the time period $t_0$–$t_1$, $\lambda$ is the rate of arrival for queue 310-1 during a time period m, and $\kappa$ is the number of service completions for queue 310-1 during the time period $t_0$-$t_1$. The execution of task 620 is further described in the discussion with respect to FIG. 7.

At task 630, routing module 320-1 determines the rate of arrival for queue 310-1 during a time period m. In accordance with the illustrative embodiment of the present invention, the rate of arrival is determined on the basis of the rate at which identifiers corresponding to communication terminals are added to queue 310-1 during a time period m. Specifically, the rate is determined by querying switch controller 220. However, it will be clear to those skilled in the art, after reading this disclosure, how to make and use alternative embodiments of the present invention in which the rate at which records are added is determined on the basis of the rate at which communication sessions are established with contact center 150.

For example, in one alternative embodiment of the present invention, contact center 150 determines the proportion of communication sessions that are routed to queue 320-1 during a first time period. Then, during a second time period, the rate at which records are added to queue 310-1 is approximated on the basis of the rate at which the communication sessions are established by contact center 150 and the proportion of communication sessions that were routed to queue 310-1 during the first time period.

As noted, at task 630, routing module 320-1 determines the rate at which callers are placed in queue 310-1 during a time period m. In accordance with the illustrative embodiment of the present invention, the time period m is two (2) minutes long, but it will be clear to those skilled in the art, after reading this disclosure, how to make and use alternative embodiments of the present invention in which the time period m has any duration (i.e. 15 minutes, 30 minutes, 2 hours, etc.). Furthermore, in accordance with the illustrative embodiment of the present invention, task 410 is executed during the time period m. That is, the communication session between caller terminal 110-4 and contact center 150 is established during the time period m. However, it will be clear to those skilled in the art, after reading this disclosure, how to make and use alternative embodiments of the present invention in which the end of period m precedes the execution of task 410. And still furthermore, it will be clear to those skilled in the art, after reading this disclosure, how to make and use alternative embodiments of the present invention in which the beginning of period m follows the execution of task 410.

At task 640, routing module 320-1 calculates the expected waiting time for caller terminal 110-4. In a first illustrative embodiment of the present invention, routing module 320-1 calculates the expected waiting time according to the equation:

$$L_a = \frac{Q_0}{\lambda} \quad \text{(Eq. 2)}$$

where $L_a$ is the expected waiting time, $Q_0$ is the length of queue 310-1 at time $t_0$, and $\lambda$ is the rate of arrival for queue 310-1 during a time period m. The value of $\lambda$ is determined at task 630 and the value of $Q_0$ is determined at task 610.

Simulation results indicate that calculating expected waiting time on the basis of the ratio of queue length and rate at which terminals are added to the queue yields better results than calculating expected waiting time on the basis of queue length and service rate for the queue. A plot of the simulation results is depicted in FIG. 11.

Figure 11:
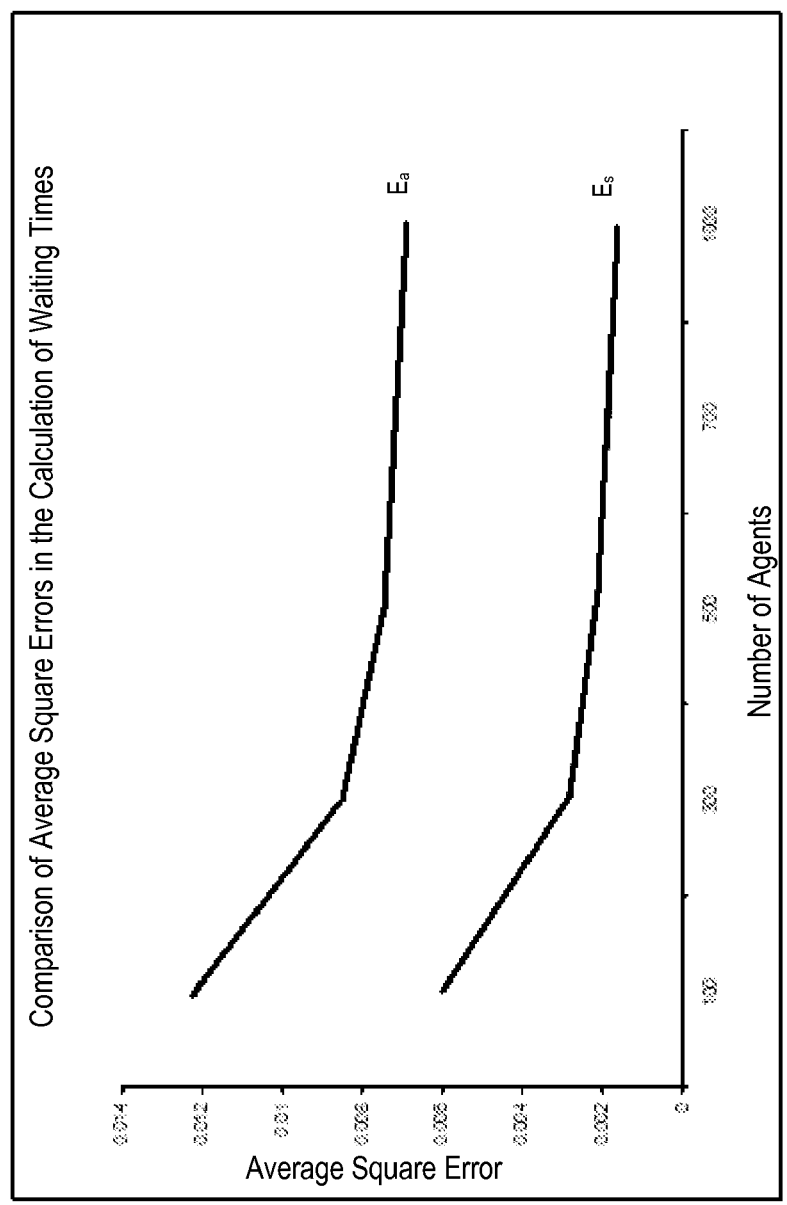
FIG. 11 depicts a plot of the average square error in estimated waiting time for a queue as a function of the number of agents that are serving the queue.

FIG. 11 depicts a plot of the average square error in estimated waiting time for a queue as a function of the number of agents that are serving the queue. The graph depicts two plots: plot $E_a$ and plot $E_b$. $E_a$ is a plot of the average square error in estimating waiting time on the basis observed queue length and the arrival rate for the queue (i.e. the method described by Equation 2). $E_b$ is a plot of the average square error in estimating waiting time on the basis of observed queue length and the service rate of the queue.

The square errors were simulated by using a non-homogeneous Poisson process with sinusoidal arrival time, service times for callers with exponential mean of ten (10) minutes, and abandonment times modeled according to an Erlang E10 distribution. The results from the simulation indicate that the use of queue arrival rate in estimating caller waiting time yields more accurate results than using the rate at which callers leave the queue.

Returning to task 640. In a second illustrative embodiment of the present invention, routing module calculates the waiting time according to the equation:

$$L_a = \frac{Q_1}{\mu} \quad \text{(Eq. 3)}$$

where $L_a$ is the expected waiting time, $Q_1$ is the expected length of queue 310-1 determined at task 620, and μ is the service rate for queue 310-1. The service rate for queue 310-1 is obtained at task 950.

In a third illustrative embodiment of the present invention, routing module calculates the waiting time according to the equation:

$$L_a = \frac{Q_1}{\lambda} \quad \text{(Eq. 4)}$$

where $L_a$ is the expected waiting time, $Q_1$ is the expected length of queue 310-1 determined at task 620, and λ is the rate of arrival for queue 310-1 during a time period m. The value of λ is determined at task 630.

Figure 7:
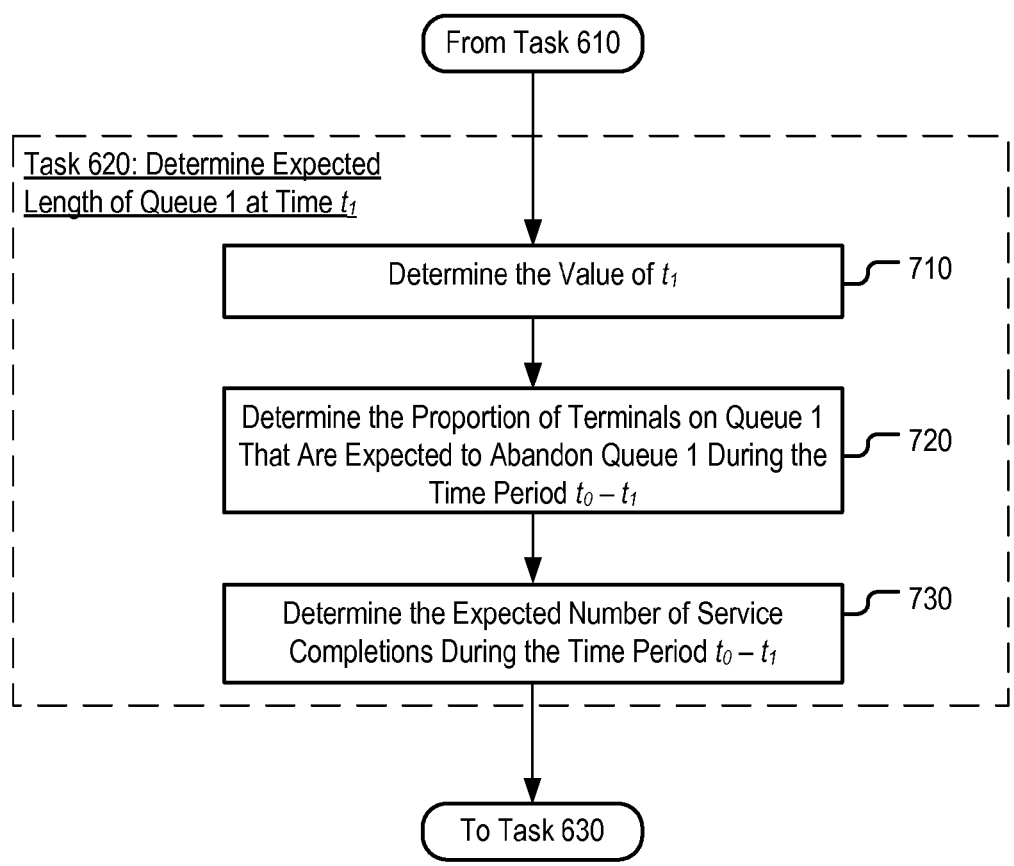
FIG. 7 depicts a flowchart of the execution of the salient subtasks associated with the performance of task 620.

FIG. 7 depicts a flowchart of the execution of the salient subtasks associated with the performance of task 620. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

In particular, FIG. 7 depicts a flowchart of the execution of the salient subtasks associated with determining the expected length of queue 310-1 at time $t_1$. As described in the discussion with respect to task 620, the expected length of queue 310-1 depends on four (4) factors:

(i.) the length of queue 310-1 at time $t_0$.
(ii.) the arrival rate for queue 310-1 during the time period m.
(iii.) the proportion of the terminals in queue 310-1 that are expected to abandon the queue by time $t_1$, and
(iv.) the number of service completions by time $t_1$.

Factors i and ii are determined at tasks 610 and 630, respectively. Factors iii and iv are determined at tasks 720 and 730.

At task 710, routing module 320-1 retrieves the value of $t_1$ from the memory of contact center 150. In accordance with the illustrative embodiment of the present invention, time $t_1$ is two minutes in the future, relative to time $t_0$, but it will be clear to those skilled in the art, after reading this disclosure, how to make and use alternative embodiments of the present invention in which time $t_1$ is at any distance in the future (e.g., 1 second, 5 minutes, 15 minutes, 1 hour, etc.).

Furthermore, in accordance with the illustrative embodiment of the present invention, a value for $t_1$ is set statically in the memory of contact center 150, but it will be clear to those skilled in the art, after reading this disclosure, how to make and use alternative embodiments of the present invention in which the value of $t_1$ is determined dynamically. In one alternative embodiment of the present invention, the value of $t_1$ is determined based on at least one of the latency of the network which connects caller terminal 110-$i$ and contact center 150, the time which it takes routing module 320 to route terminal 110-4 to a queue (i.e. execute tasks 510 and 520), the time which it takes contact center 150 to determine the waiting time for a caller terminal, and the time which it takes for contact center 150 to transmit an indication of the waiting time. In this way, the value of $t_1$ accounts for different latencies exhibited by contact center 150.

At task 720, routing module 320-1 determines the proportion of terminals that are expected to abandon queue 310-1 during the time period $t_0$-$t_1$. Caller terminals abandon queue 310-1 when their connection with contact center 150 is discontinued prior to the caller terminals being connected to an agent. In accordance with the illustrative embodiment of the present invention, the proportion of terminals that are expected to abandon queue 310-1 is determined on the basis of the expected number of abandonments during the time period $t_0$-$t_1$ and the length of queue 310-1 at time $t_0$.

Specifically, in accordance with the illustrative embodiment of the present invention, the proportion is determined according to the equation:

$$p = \frac{E}{Q_0} \quad \text{(Eq. 5)}$$

where p is the proportion of terminals that are expected to abandon queue 310-1 during the time period $t_0$-$t_1$, $Q_0$ is the length of queue 310-1 at time $t_0$, and E is the number of terminals that are expected to abandon queue 310-1 during the time period $t_0$-$t_1$. The value of E is determined at task 840. The execution of task 720 is further described in the discussion with respect to FIG. 8.

At task 730, routing module 320-1 determines the expected number of service completions for queue 310-1 during the time period $t_0$-$t_1$. The number of service completions for queue 310-1 is the number of communication sessions between caller terminals from queue 310-1 and agent terminals 190-$j$ that are completed during the time period $t_0$-$t_1$. In accordance with the illustrative embodiment of the present invention, the number of expected service completions is determined according to the equation:

$$\kappa = \mu(t_1 - t_0) \quad \text{(Eq. 6)}$$

where κ is the number of service completions for queue 310-1 during the time period $t_0$-$t_1$ and μ is the service rate for queue 310-1.

The service rate for the queue corresponds to the number of calls from queue 310-1 that are completed by agents 195-$j$ per unit time. In accordance with the illustrative embodiment of the present invention, the service rate for queue 310-1 is determined according to the equation:

$$\mu = \sum_i \mu_i \quad \text{(Eq. 7)}$$

where μ is the service rate for queue 310-1, and $\mu_i$ is summed over all agents that are serving queue 310-1. In other words, the service rate for queue 310-1 is equal to the sum of the service rates of the individual agents that serve the queue. The service rate of queue 310-1 is determined at task 810.

Figure 8:
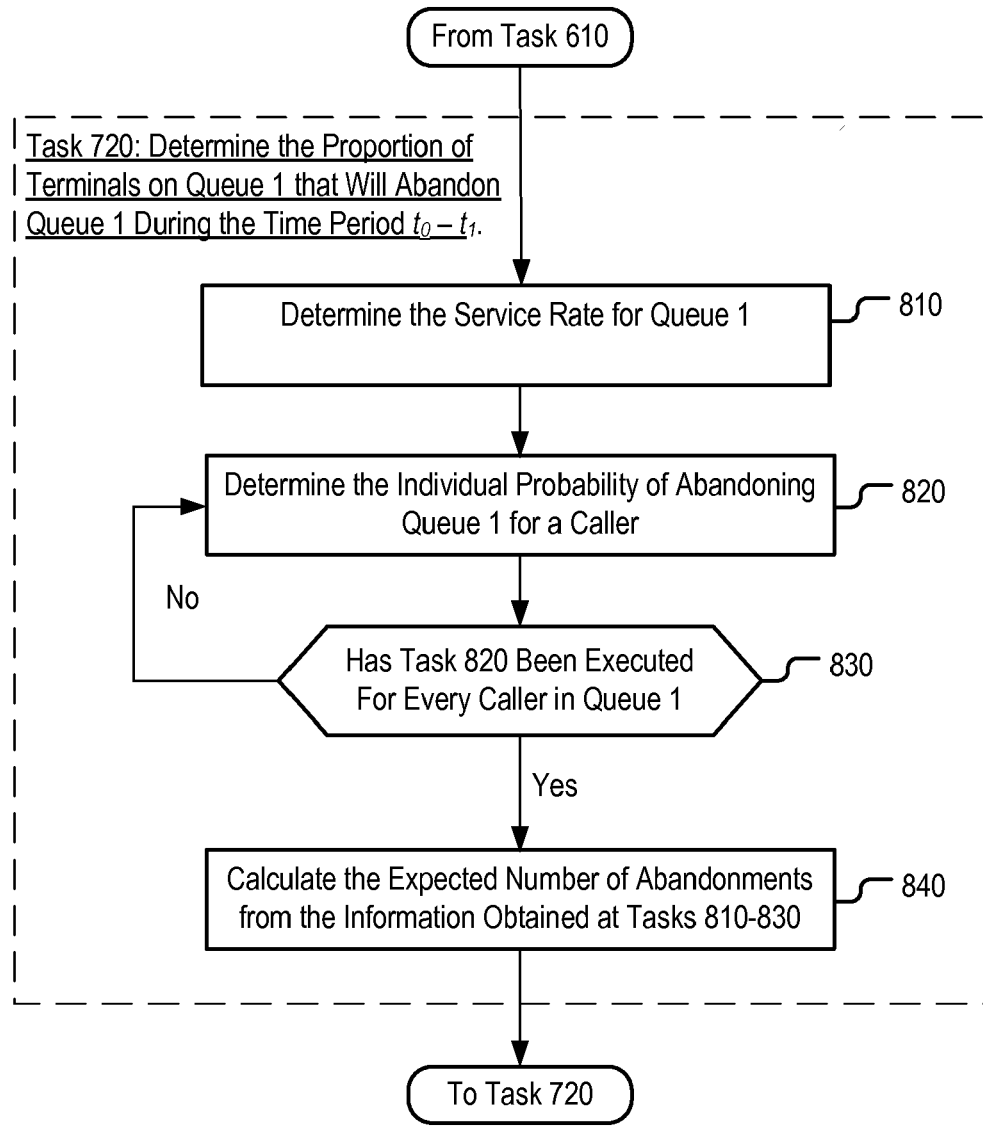
FIG. 8 depicts a flowchart of the execution of the salient subtasks associated with the performance of task 720.

FIG. 8 depicts a flowchart of the execution of the salient subtasks associated with the performance of task 720. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

In particular, FIG. 8 depicts a flowchart of the salient subtasks associated with determining the proportion of caller terminals in queue 310-1 that are expected to leave queue 310-1 before they have been connected to one of agent terminals 190-$j$. As described in the discussion of task 720, the proportion depends on two factors:

(i.) the length of the queue at time $t_0$, and (ii.) the expected number of terminals that would abandon queue 310-1 during the time period $t_0$-$t_1$.

The expected number of terminals that would abandon queue 310-1 depends on two factors itself:

(i.) the service rate of queue 310-1, and (ii.) the probability that a caller would not have abandoned queue 310-1 at time $t_1$.

The service rate of queue 310-1 is determined at task 810. The probability that a caller would not have abandoned queue 310-1 at time $t_1$ is determined at task 820. And the expected number of abandoning terminals is determined at task 840.

At task 810, routing module 320-1 determines the service rate for queue 310-1. Task 810 is further described in the discussion with respect to FIG. 9.

At task 820, routing module 320-1 determines the probability that a caller at position r in queue 310-1 would not have abandoned the queue at time $t_1$. In accordance with the illustrative embodiment of the present invention, the probability is determined according to the equation:

$$\tau_r = \prod_{l=1}^{r} \left[ 1 - \frac{h\left(\frac{l}{\lambda}\right)}{\mu + \sum_{u=l}^{r} h\left(\frac{u}{\lambda}\right)} \right] \quad \text{(Eq. 8)}$$

where $\tau_r$ is the probability that a caller at position r in queue 310-1 would not have abandoned the queue at time $t_1$, $\mu$ is the service rate for queue 310-1, h(t) is a hazard rate function, and $\lambda$ is the rate of arrival for queue 310-1 during the time period m. The value of $\mu$ is determined at task 810 and the value of $\lambda$ is determined at task 630.

Figure 12:
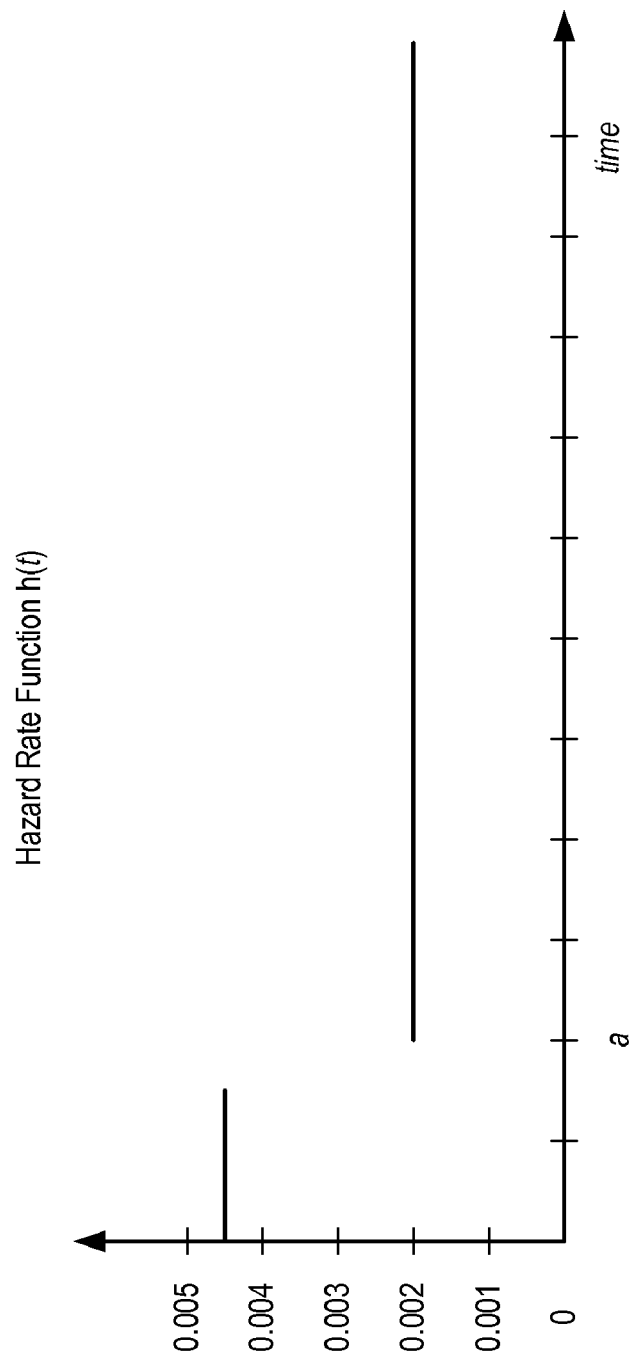
FIG. 12 depicts a plot of the hazard rate function h(t) that is used in the illustrative embodiment of the present invention.

The hazard function h(t) is the instantaneous probability of abandoning queue 310-1 upon spending an amount of time in the queue. In accordance with the illustrative embodiment of the present invention, the hazard function h(t) is a piecewise constant model of the form:

$$h_i(t) = \begin{cases} c_1 & \text{for } 0 \le t < a \\ c_2 & \text{for } t > a \end{cases} \quad \text{(Eq. 9)}$$

where h(t) is the instantaneous probability of abandoning the queue and t is time spent in the queue. FIG. 12 depicts a plot of the hazard rate function h(t) that is used in the illustrative embodiment of the present invention. In accordance with the illustrative embodiment of the present invention the value of $c_1$ is 0.45, the value of $c_2$ is 0.2. Also, the value of a is 1.5 seconds.

At task 830, routing module 320-1 determines whether task 820 has been executed for every caller in queue 310-1. If it has, routing module 320-1 proceeds to execute task 840. Otherwise, routing module 320-1 executes task 820 again.

At task 840, routing module 320-1 determines the expected number of callers that are expected to abandon queue 310-1 during the time period $t_0$-$t_1$. Specifically, routing module 320-1 determines the number of callers that are expected to abandon queue 310-1 based on the individual probabilities of abandoning determined at task 820. In accordance with the illustrative embodiment of the present invention, the number of callers that are expected to abandon queue 310-1 is calculated according to the equation:

$$E = \sum_{r=1}^{Q_0} (1 - \tau_r) \quad \text{(Eq. 10)}$$

where E is the number of callers that are expected to abandon queue 310-1 by time $t_1$, $Q_0$ is the length of queue 310-1 at time $t_0$ (i.e. the number of callers in queue 310-1), and where $\tau_r$ is the probability that a caller at position r in queue 310-1 would not have abandoned the queue at time $t_1$.

Figure 9:
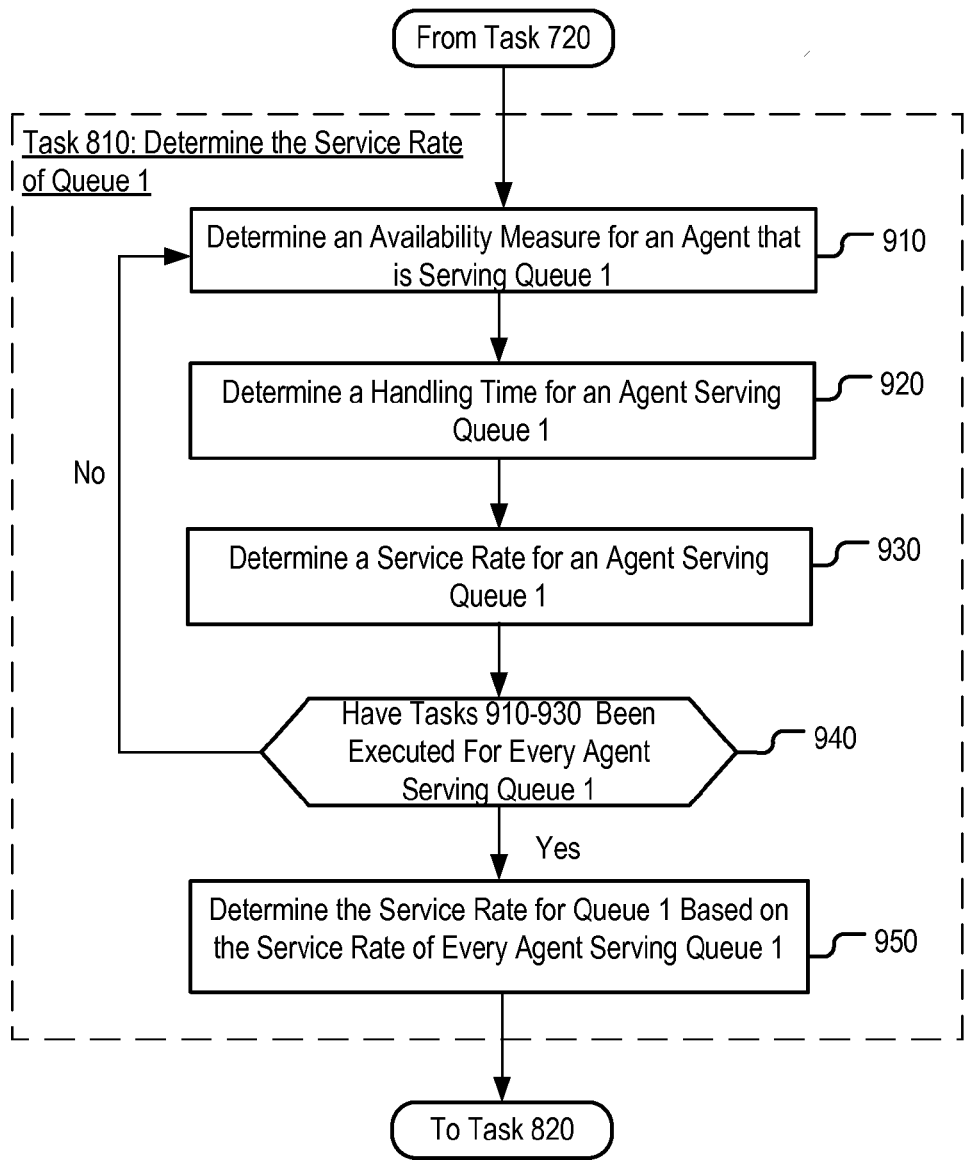
FIG. 9 depicts a flowchart of the execution of the salient subtasks associated with the performance of task 810.

FIG. 9 depicts a flowchart of the execution of the salient subtasks associated with the performance of task 810. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

In particular, FIG. 9 depicts a flowchart of the salient subtasks associated with determining the service rate of queue 310-1. In accordance with the illustrative embodiment of the present invention, the service rate of queue 310-1 depends on at least one of two factors:

(i.) availability measures for the agents that are serving queue 310-1, and (ii.) the handling times of the individual agents that are serving queue 310-1.

Factor i is determined at task 910. And factor ii is determined at task 920.

At task 910, routing module 320-1 determines an availability measure for an agent that is serving queue 310-1. Task 910 is further described in the discussion with respect to FIG. 10.

At task 920, routing module 320-1 determines the average handling time of an agent for calls from all queues that are served by the agent. The average handling time of an agent with respect to a queue is the average time which it takes the agent to complete a call with a caller from the queue. In accordance with the illustrative embodiment of the present invention, the average handling time of the agent is determined ahead of time and stored in the memory of contact center 150 from where it is retrieved by routing module 320-1. The handling times of agents 195-$j$ can be determined automatically by contact center 150. It will be clear to those skilled in the art how to determine the average handling time of an agent.

At task 930, routing module 320-1 determines the service rate for an agent that is serving queue 310-1. In accordance with the illustrative embodiment of the present invention, the service rate is determined based on both the availability and average handling time of the agent. Specifically, routing module 320-1 calculates the service rate according to the equation:

$$\mu_i = \frac{a_i}{\sum_l \delta_{il}} \quad \text{(Eq. 11)}$$

where $\mu_i$ is the service rate for agent i, $a_i$ is an availability measure for agent i, and the sum $\Sigma \delta_{il}$ is the sum of the average handling times of agent i for all queues l that are served by the agent.

At task 940, routing module 320-1 determines whether a service rate is determined for every agent that is serving queue 310-1. If the service rate for every agent is determined, routing module 320-1 proceeds to execute task 950. Otherwise, routing module 320-1 executes tasks 910-930 again.

At task 950, routing module 320-1 determines the service rate for queue 310. As discussed with respect to task 730, routing module 320-1 determines the service rate for queue 310-1 by calculating the sum of the service rates for all agents that are serving queue 310-1.

Figure 10:
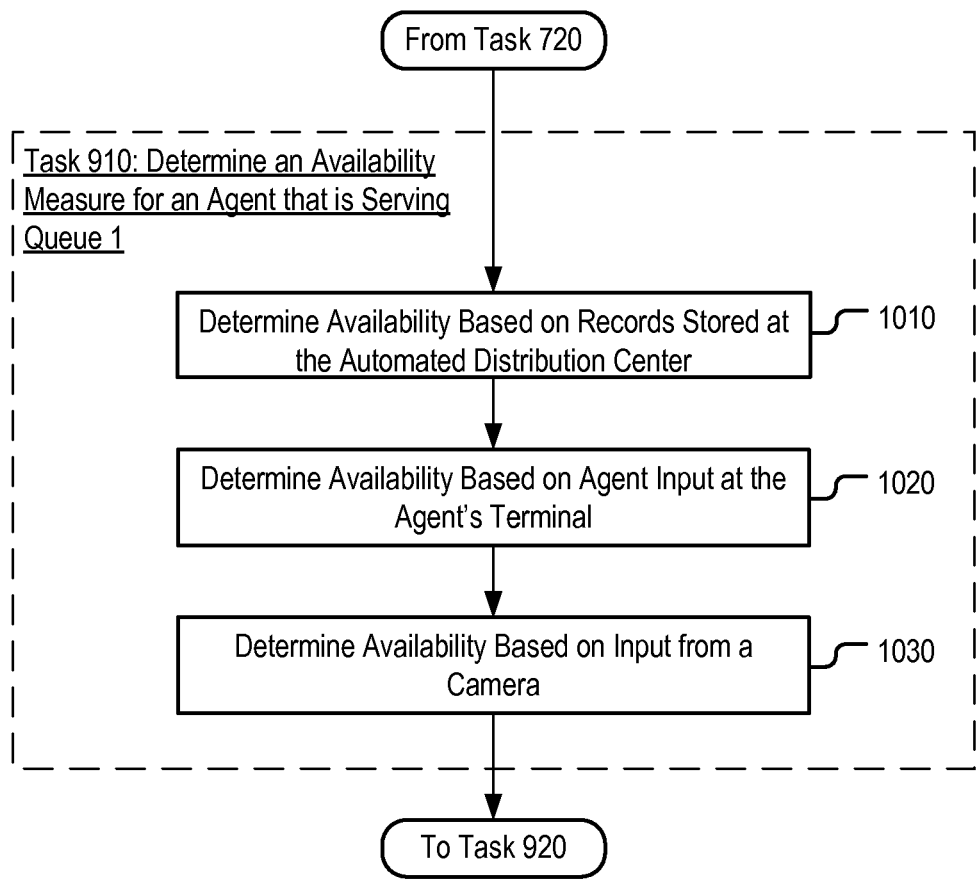
FIG. 10 depicts a flowchart of the execution of the salient subtasks associated with the performance of task 910.

FIG. 10 depicts a flowchart of the execution of the salient subtasks associated with the performance of task 910. It will be clear to those skilled in the art, after reading this disclosure, how to perform the tasks associated with FIG. 10 in a different order than represented or to perform one or more of the tasks concurrently. Furthermore, it will be clear to those skilled in the art, after reading this disclosure, how to make and use alternative embodiments of the present invention that omit one or more of the tasks.

In particular, FIG. 10 depicts a flowchart of the salient subtasks associated with obtaining an availability measure for an agent. In accordance with the illustrative embodiment of the present invention, the availability measure is obtained by contact center 150 in at least one of three ways:
  i. retrieving a record stored in the memory of contact center 150,
  ii. receiving input from the agent, and
  iii. receiving input from a camera.

At task 1010, switch controller 220 retrieves an availability measure for an agent from a database stored in the memory of contact center 150. In accordance with the illustrative embodiment of the present invention, the availability measure is stored in the database ahead of time by the agents themselves or by an administrator of contact center 150.

At task 1020, contact center 150 determines the availability measure for an agent on the basis of input provided by the agent. In accordance with the illustrative embodiment of the present invention, every agent is supplied user interface on his or her agent terminal. The user interface permits the agent to indicate when the agent is available to take calls. For example, and without limitation, if an agent has to step away from his or her terminal in order to talk to a supervisor, the agent will mark a check box indicating that the agent is not available to take calls. When the agent comes back from the meeting with the supervisor, the agent un-marks the check box thereby indicating that the agent is again available to take incoming calls. The input from the agent is transmitted to contact center 150 which uses it to determine the proportion of time during which an agent is available to take phone calls.

In one alternative embodiment of the present invention, contact center 150 determines a measure of the probability that the agent will fail to take calls when the agent is considered by contact center 150 to be available. The probability measure accounts for situations in which the agent refuses to answer calls that have been routed to him or her even though the agent has indicated that he or she is available. Contact center 150 uses the probability measure to adjust the availability measure determined on the basis of the user input. In this way, contact center 150 further increases the accuracy of the availability measure determined at task 1020.

At task 1030, contact center 150 determines an availability measure for an agent on the basis of input from a camera that is connected to the terminal of the agent. The camera feeds images into image processing software which determines when the agent is present in the field of view of the camera. If the agent is present in the field of view of the camera, the agent is considered to be available to take calls. In accordance with the illustrative embodiment of the present invention, contact center 150, uses the data received from the camera to determine the proportion of time during which an agent is available to take phone calls.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
  establishing, at a contact center, a communication session with a first communication terminal;
  storing in a queue, at the contact center, an identifier corresponding to the first communication terminal, wherein the queue contains identifiers for a first plurality of communication terminals that are engaged in communication sessions with the contact center; and
  transmitting from the contact center to the first communication terminal a message containing an indication of waiting time, wherein:
    i. the indication of waiting time depends on an estimate of a length of the queue,
    ii. the estimate of the length of the queue reflects the length which the queue is expected to have at time $t_1$,
    iii. the estimate of the length of the queue depends on an abandonment measure,
    iv. the abandonment measure is an estimate of the number of communication sessions, between communication terminals from the first plurality and the contact center, that are expected to be discontinued prior to the communication terminals being connected to a communication terminal that is operated by an agent of the contact center,
    v. the abandonment measure is an estimate of the number of communication sessions that are expected to be discontinued by time $t_1$, and
    vi. the abandonment measure depends on a service rate of the queue.

2. The method of claim 1 wherein the service rate of the queue depends on an availability measure for a first agent that is serving the queue.

3. The method of claim 1 wherein the estimate of the length of the queue depends on the rate at which communication sessions with the contact center are established.

4. The method of claim 1 wherein the estimate of the length of the queue depends on the rate at which identifiers corresponding to communication terminals are added to the queue.

5. The method of claim 1 wherein the estimate of the length of the queue is made at time $t_1$.

6. The method of claim 5 wherein the value of $t_1$ depends on the time lapse between the establishment of the communication session and the storing of an identifier corresponding to the communication terminal in the queue.

7. The method of claim 1 wherein:
  the estimate of the length of the queue is made at time $t_0$; and
  $t_0 < t_1$.

8. A method comprising:
  establishing, at a contact center, a communication session with a first communication terminal;
  storing in a queue, at the contact center, an identifier corresponding to the first communication terminal, wherein the queue contains identifiers for a first plurality of communication terminals that are engaged in communication sessions with the contact center; and transmitting from the contact center to the first communication terminal a message containing an indication of waiting time, wherein:
  i. the indication of waiting time depends on an estimate of a length of the queue,
  ii. the estimate of the length of the queue reflects the length which the queue is expected to have at time $t_1$, and
  iii. the estimate of the length of the queue depends on an availability measure for a first agent that is serving the queue.

9. The method of claim 8 wherein the estimate of the length of the queue depends on the rate at which communication sessions with the contact center are established.

10. The method of claim 8 wherein the estimate of the length of the queue depends on the rate at which identifiers corresponding to communication terminals are added to the queue.

11. The method of claim 8 wherein:
the estimate of the length of the queue is made at time $t_0$; and
$t_0 < t_1$.

12. The method of claim 8 wherein the estimate of the length of the queue is made at time $t_1$.

13. The method of claim 8 wherein the value of $t_1$ depends on the time lapse between the establishment of the communication session and the storing of an identifier corresponding to the communication terminal in the queue.

14. A method comprising:
establishing, at a contact center, a communication session with a first communication terminal;
storing in a queue, at the contact center, an identifier corresponding to the first communication terminal, wherein the queue contains identifiers for a first plurality of communication terminals that are engaged in communication sessions with the contact center; and
transmitting from the contact center to the first communication terminal a message containing an indication of waiting time, wherein:
  i. the indication of waiting time depends on an estimate of a length of the queue,
  ii. the estimate of the length of the queue reflects the length which the queue is expected to have at time $t_1$, and
  iii. the estimate of the length of the queue depends on a rate at which identifiers corresponding to communication terminals are added to the queue.

15. The method of claim 14 wherein $t_1$ is the time at which the communication terminal is expected to receive the message transmitted from the contact center.

16. The method of claim 14 wherein:
the estimate of the length of the queue is made at time $t_0$; and
$t_0 < t_1$.

17. The method of claim 14 wherein the estimate of the length of the queue is made at time $t_1$.

* * * * *